Dec. 5, 1961        H. B. BABSON        3,011,755
MILK PIPELINE VALVE
Filed July 11, 1958        2 Sheets-Sheet 1
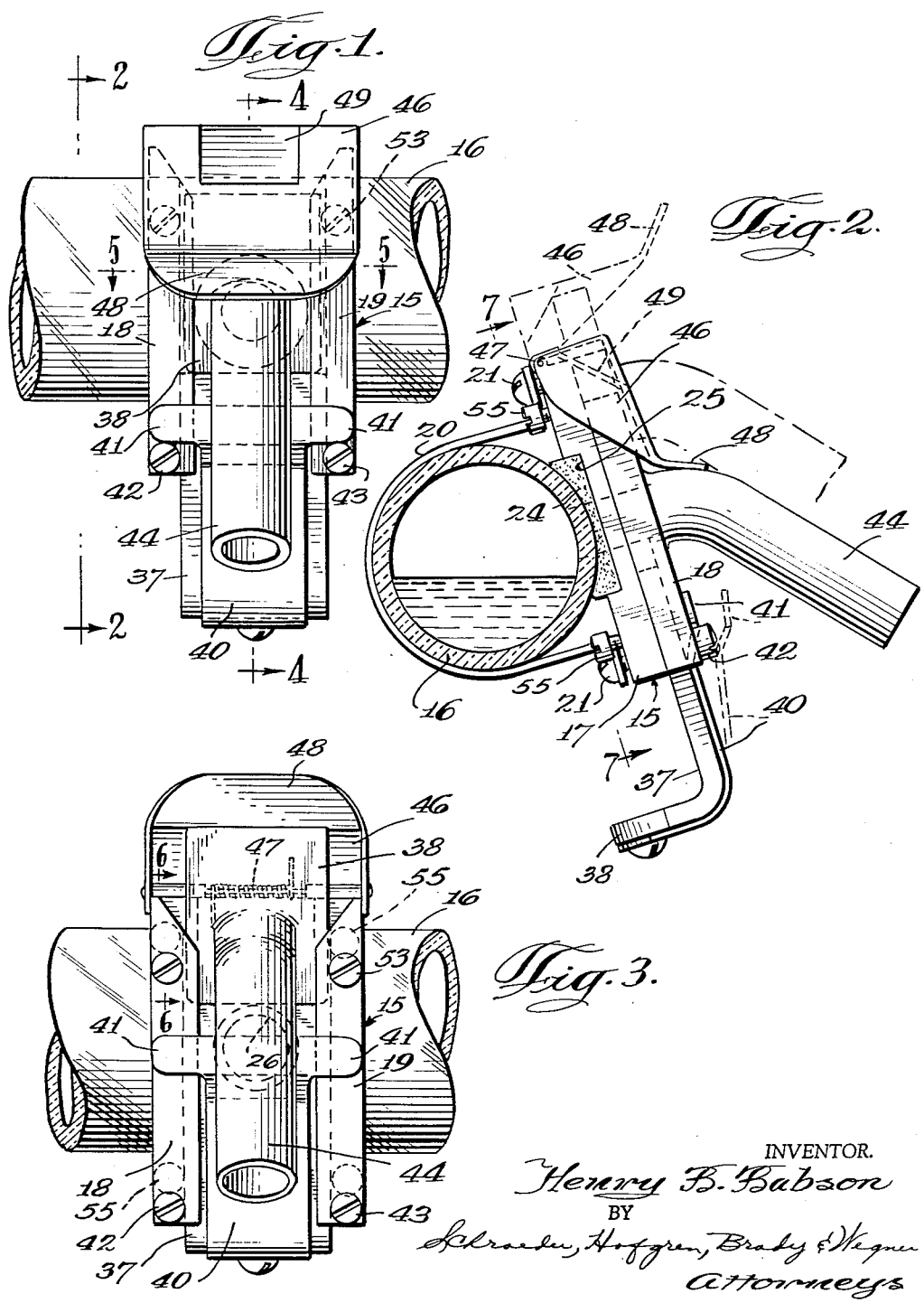
INVENTOR.
Henry B. Babson
BY
Schroeder, Hofgren, Brady & Wegner
Attorneys

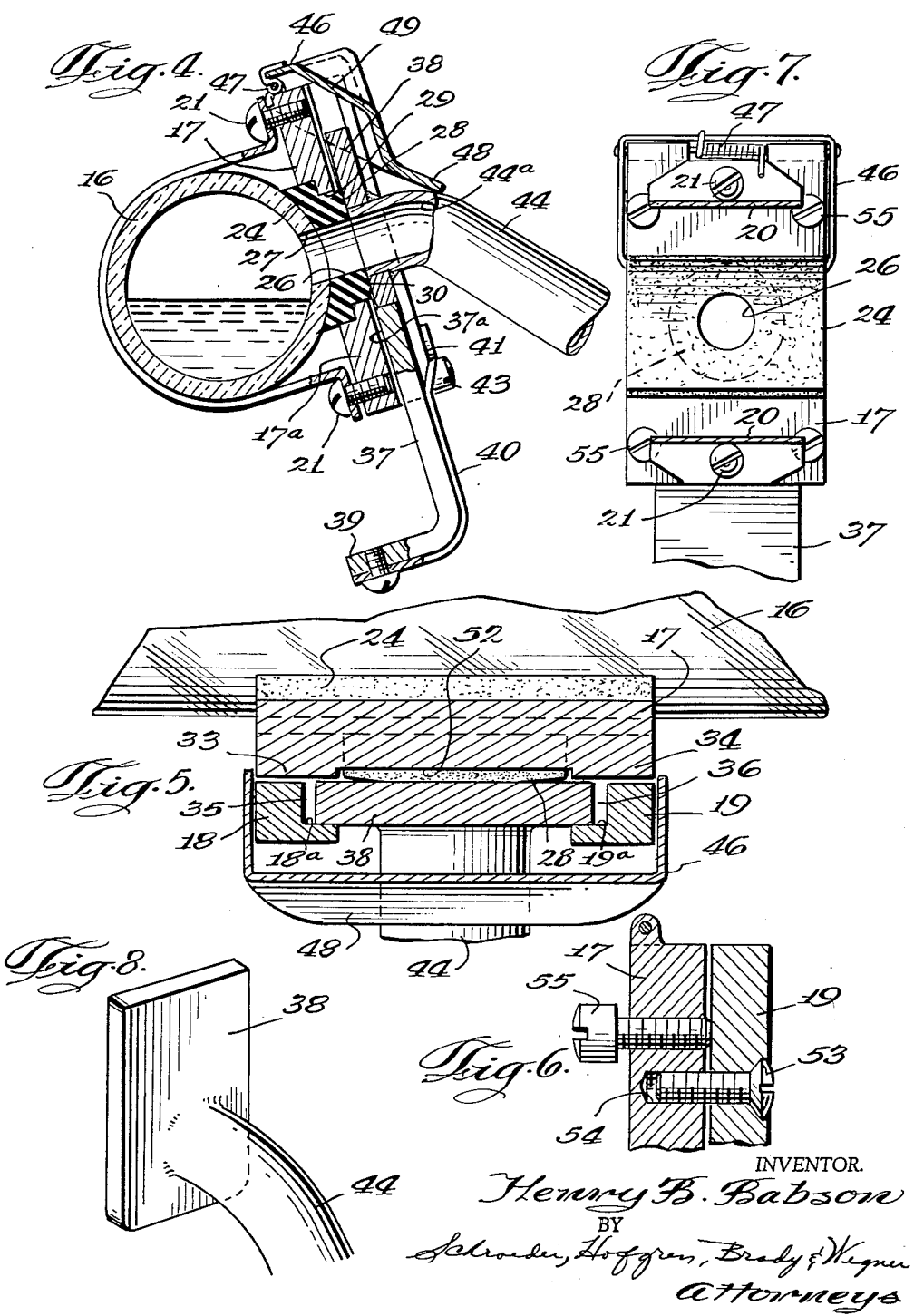

United States Patent Office 3,011,755
Patented Dec. 5, 1961

3,011,755
MILK PIPELINE VALVE
Henry B. Babson, Chicago, Ill., assignor to Babson Bros.
Co., a corporation of Illinois
Filed July 11, 1958, Ser. No. 747,870
9 Claims. (Cl. 251—146)

This invention is concerned with a valve for use with a carry-away milk pipeline.

Many dairy farms utilize "carry-away" milk handling systems in which the milk from the animals is drawn into a pipeline by vacuum and flows through the pipeline to a bulk storage tank, milk cans or through additional handling apparatus, as a releaser, or pasteurizing equipment or the like, to the holding or storage means. In certain types of installations, the milk from the actual milking apparatus is introduced into the pipeline through a valve of which there may be several at different points along the length of the pipeline. In a system designed for the production of top-grade milk, it is important that the valve be so constructed that it does not afford an opportunity for the introduction of foreign matter to the pipeline nor for the contamination of milk contacting surfaces. It is also desirable that the valve be of such construction that it may be washed by a "CIP" or "cleaned-in-place" washing operation.

The valve of the present invention is of the type which may be described as a sliding plate valve, and is a modification of the valve shown in Merritt et al. application Serial No. 704,430, filed December 23, 1957, and assigned to the assignee of this invention, now Patent 2,987,294, issued June 6, 1961.

One feature of the valve is that it includes a valve seat associated with an opening in a pipeline, valve means having a sealing surface, guide means mounted on the pipeline and supporting the valve means for movement at right angles to the pipeline between a first position in which the valve is engaged with the valve seat, and a second position in which the valve is removed from the seat, together with backing means adjacent the sealing surface of the valve means when in the second position.

A further feature is that the guide means are open at one end to receive a valve connector fitting for connecting the milking apparatus to the pipeline. Still another feature is that the valve member is provided with a stop arrangement so that in its limiting position it positions the connector member for communication with the pipeline. Yet a further feature is that the open end of the guide means is provided with an openable cover.

And another feature is that the backing member has rail portions at either edge thereof with a pair of rail elements secured thereto forming the guide for the valve member, and the backing member is recessed between the rail portions so that the sealing surface of the valve member touches only the valve seat, regardless of its position.

Further features and advantages of the invention will readily be apparent from the specification and from the drawings, in which:

FIGURE 1 is a front elevation of a valve embodying the invention, mounted on a pipeline and with the valve connector in place;

FIGURE 2 is a side view of the valve taken generally along the line 2—2 of FIGURE 1, with the valve connector shown partially removed in broken lines;

FIGURE 3 is a view similar to FIGURE 1 with the connector partially removed and the valve closed;

FIGURE 4 is a vertical section through the valve, taken generally along lines 4—4 of FIGURE 1;

FIGURE 5 is a transverse section through the valve taken generally along line 5—5 of FIGURE 1;

FIGURE 6 is an enlarged fragmentary detail of the guide rail mounting;

FIGURE 7 is a section taken generally along lines 7—7 of FIGURE 2; and

FIGURE 8 is a perspective view of the connector and nipple.

Milk pipeline valves are required principally in stanchion milking systems where milk withdrawing equipment such as that shown in Thomas United States Letters Patent 2,783,737 is utilized for milking the animal, and the milk is taken from the apparatus through a hose and valve into the pipeline. The pipeline itself is usually mounted above the front of the line of stalls, over the heads of the animals, and may be five or six feet above the floor of the stall. The operator, in moving the milking equipment from one animal to the next, must operate the valve and connect the flexible milk hose to it, making it desirable that the valve be easy to operate and so constructed that this connection may readily be made.

Turning now to the drawings, and particularly to FIGURES 1–3, a valve body indicated generally as 15 is shown mounted on a pipeline 16, preferably of stainless steel or glass. The valve body includes a backing member 17 and a pair of rail elements 18 and 19, one fastened along each edge thereof. A strap 20 is secured to the backing member 17 by screws 21 and encircles pipeline 16 holding the valve body in place thereon.

A sealing element 24, which is preferably of a non-porous, resilient material as neoprene rubber, is carried in a recess 25 in the undersurface of the backing plate 17. Sealing element 24 has a flow passageway 26 therethrough which communicates with a hole 27 formed in the wall of pipe 16, FIGURE 4. The inner surface of sealing element 24 is curved to fit the surface of pipeline 16, and sufficient pressure is exerted on the sealing element by backing plate 17 to afford tightly sealed engagement therebetween. The bore 26 of the sealing element and hole 27 in the pipeline are preferably of the same diameter, as shown, so that they join each along a straight line eliminating any crevices in which milk might lodge. Sealing element 24 has a valve seat portion 28 which extends through an opening 29 in the center of the backing plate, presenting a slightly rounded sealing surface 30 above the surface of the backing plate.

Rail elements 18 and 19 are L-shaped in cross section (FIGURE 5) and, with the rail portions 33 and 34 along either edge of backing member 17, form guide channels 35 and 36 for valve member 37 and connector member 38.

Valve member 37 has a rearwardly extending portion 39 at the lower end thereof which may be grasped manually to effect movement of the valve member between closed position (FIGURE 3) and open position (FIGURE 1). A latch plate 40, of resilient material, is secured to the extension 39 of the valve member and has arms 41 overlying rails 18 and 19. These arms engage the heads of rail retaining screws 42 and 43 on downward movement of the valve member stopping it in open position.

Valve connector member 38 has a generally flat plate portion slidable within the channels 35 and 36, and to which is secured nipple 44. The hose from the milking apparatus (not shown) is connected to nipple 44.

The upper end of the valve body 15 is provided with a pivotally mounted cover 46, secured to backing plate 17 and urged by spring 47 to a position covering the upper end of the valve body, and guide channels 35 and 36. The lower portion of the cover 46 is formed outwardly to form a tab 48 to facilitate lifting the cover.

Valve member 37 is normally left in the raised or closed position, with the rear or undersurface thereof in sealing engagement with the upper surface 30 of the valve seat. In making a connection to the pipeline, the operator lifts cover 46 with the upper edge of connector plate 38 and engages the plate in channels 35 and 36, as illustrated in broken lines in FIGURE 2. The connector is then moved downwardly forcing the valve member 37 away from the valve seat and bringing the undersurface of the connector into sealing engagement with valve seat 30, the bore 26 of the sealing element being aligned with bore 44a of the connector nipple. This puts the evacuated pipeline 16 in direct communication with the milk withdrawing apparatus, milk flowing from the apparatus through the milk hose and nipple 44 into the pipeline. When use of the valve is completed and the operator wishes to disconnect the apparatus to move it to another animal, an upward movement of the valve member 37 pushes the connector 38 upwardly in channels 35 and 36 and recloses the valve. This operation automatically lifts cover 46 and permits removal of connector 38.

A portion of cover 46 is formed at an oblique angle with respect to the direction of guide channels 35 and 36, providing a surface 49 against which the upper edge of connector 38 moves during the removal operation so that the cover is cammed upwardly and the connector does not lodge in the interior corner thereof.

The wiping action of both the valve plate 37 and connector plate 38 as they move across the sealing surface 30 of the valve seat removes substantially all milk residue or other foreign material from the contacting surfaces, so that foreign material is not introduced in the milk handling system, and milk is not left on the valve and connector surfaces when they are out of communication with the pipeline. This contributes to the cleanliness of the system, as the dry sealing surface of connector plate 38 is not likely to pick up dirt or be contaminated by flies or other insects when it is moved from one valve to another.

The lower portion 17a of the backing member, which extends below the resilient sealing element 24, protects the rear or sealing surface 37a of the valve member from contamination while the valve is open. The portion 52 of the backing member between the rail portions 33 and 34 is recessed slightly, as a sixteenth of an inch, so that the sealing portion 37a of the valve member and the central portion of the undersurface of connector plate 38 do not come in contact therewith during manipulation of the valve. This prevents any milk which might remain on the sealing surfaces, despite the wiping action of the valve seat, from being transferred to the backing plate. The space between the backing plate and the valve and connector member is sufficiently small so that insects such as flies cannot gain entry.

Rail elements 18 and 19 are adjustably mounted on backing member 17 so that the distance between the bearing surfaces 18a and 19a, respectively, and the sealing surface 30 of the valve seat may be varied to provide the required contact pressure between the valve seat and the valve and connector plates. As best seen in FIGURE 6, which represents the upper end of the right-hand rail 19, a screw 53 extends through the rail and is threaded into a tapped opening 54 in backing member 17. A pressure screw 55 is threaded through backing member 17 and engages the undersurface of rail 19 holding it tightly in position. This arrangement is repeated at each end of the two rails.

It will be noted that the hole 27 through the pipeline is positioned slightly above the horizontal axis out of the pipeline. This is preferable, not only to position the valve in a location where it is easy for the operator to manipulate it, but also to insure that the valve does not have any crevices in which milk or washing solution may be trapped. With this arrangement the valve may be washed as a part of a CIP washing operation in which washing solutions, as a detergent, sanitizing and rinse solutions are circulated through the pipeline, either by a pump or by vacuum. Sufficient washing solution enters hole 27 and valve seat bore 26 to wash the milk contacted surfaces thereof and yet this washing solution drains from the valve as the line is emptied. The joint between the wall of the pipe and the bore 26 of the sealing element 24 is flush, so that no milk or washing solution is trapped at that point. Little or no milk adheres to the undersurface of valve member 37 so that the washing operation is easily effected.

Regardless of the adequacy of the in-place washing operation, best milking practice requires that the milk line valve be disassembled periodically and scrubbed. To this end, latch member 40 is formed of a resilient material so that ears 41 may be sprung outwardly, as shown in broken lines in FIGURE 2, permitting the entire valve member to be removed. When this is done, the valve member, the surface of the backing member 17 and of rails 18 and 19, and of sealing element 24 are completely exposed and may be scrubbed. There are no hidden crevices which cannot readily be reached and thoroughly cleaned with a small brush, or cloth.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a pipeline valve: a valve seat associated with an opening in a pipeline; an imperforate valve plate having a sealing surface; guide means mounted on said pipeline and supporting said valve plate for movement in a plane at right angles to the pipeline, between a first position in which the sealing surface is engaged with said seat, and a second position in which the valve is removed from said seat; and backing means adjacent to and spaced from the sealing surface of said valve plate in said second position.

2. In a pipeline valve: a valve seat associated with an opening in a pipeline; an imperforate valve plate having a sealing surface; guide means mounted on said pipeline and supporting said valve plate for movement in a plane at right angles to the pipeline, between a first position in which the sealing surface is engaged with said seat, and a second position in which the sealing surface is removed from said seat, said guide means being open at one end thereof to receive a valve connector, movable into engagement with said valve seat when said valve plate is in said second position; and backing means adjacent to and spaced from the sealing surface of said valve plate in said second position.

3. In a pipeline valve: a valve seat associated with an opening in a pipeline; valve means having a sealing surface; guide means mounted on said pipeline and supporting said valve means for movement in a plane at right angles to the pipeline, between a first position in which the sealing surface is engaged with said seat, and a second position in which the valve is removed from said seat; stop means for limiting the movement of said valve means, establishing said second position; a valve connector removably engageable with said guide means and being positioned in communication with said valve seat by engagement with said valve means, in said second position; and backing means adjacent to and spaced from the sealing surface of said valve means in said second position.

4. In a pipeline valve: a valve seat associated with an opening in a pipeline; valve means; guide means, open at one end, mounted on said pipeline and supporting said valve means for movement in a plane at right angles to the pipeline, between a first position in which the valve means is engaged with said seat, and a second position in which the valve is removed from said seat; a valve connector removably engageable with said guide means and a cover for the open end of said guide means and removable therefrom to permit insertion and removal of said connector.

5. In a pipeline valve: a valve seat associated with an opening in a pipeline; valve means having a sealing surface; guide means mounted on said pipeline and supporting said valve means for movement in a plane at right angles to the pipeline, between a first position in which the sealing surface of the valve means is engaged with said seat, and a second position in which the valve is removed from said seat; stop means for limiting the movement of said valve means, establishing said second position, said stop means including a releasable spring-urged latch, release of which frees said valve means for removal from said guide means.

6. In a valve for a generally horizontal pipeline: a valve seat associated with an opening in a pipeline; an imperforate valve member having a sealing surface; guide rails mounted on said pipeline and supporting said valve member for movement from a first position in which the sealing surface of the valve member is engaged with said valve seat downwardly to a second position in which the valve member is removed from said valve seat; and a backing member between said rails, adjacent to and spaced from the sealing surface of said valve member in said second position.

7. In a pipeline valve: a valve seat associated with an opening in a pipeline; a valve member having a sealing surface; a pair of rail elements; a backing member secured to said pipeline, having rail portions at either edge forming with said rail elements a guide for said valve member, the valve member being movable between a first position in which the sealing surface of the valve is engaged with said seat, and a second position in which the sealing surface is removed from said seat, said backing member being recessed between said rail portions forming a protective surface adjacent, but spaced from, the sealing surface of said valve member in said second position.

8. The pipeline valve of claim 7, wherein said rail elements are adjustably mounted on said backing member.

9. In a pipeline valve: a valve seat associated with an opening in a pipeline; a valve member having a sealing surface; guide rails mounted on said pipeline and supporting said valve member for movement from a first position in which the sealing surface of the valve member is engaged with said valve seat downwardly to a second position in which the valve member is removed from said valve seat; a backing member between said rails, adjacent to and spaced from the path of movement of the sealing surface of said valve member between said first and second positions; a removable connector slidably supported by said guide rails; and a cover pivoted to the top of said backing member and spring-urged toward a position covering the upper end of said guide rails, said cover being movable about said pivot, uncovering the upper end of said guide rails for insertion and removal of said connector.

References Cited in the file of this patent

UNITED STATES PATENTS

| | | |
|---|---|---|
| 320,010 | Smith | June 16, 1885 |
| 697,358 | Penner | Apr. 8, 1902 |
| 2,146,336 | Frey | Feb. 7, 1939 |
| 2,647,539 | Stearns | Aug. 4, 1953 |
| 2,779,608 | Abbey | Jan. 29, 1957 |
| 2,838,066 | Harris | June 10, 1958 |
| 2,881,010 | Bouma | Apr. 7, 1959 |

FOREIGN PATENTS

| | | |
|---|---|---|
| 76,693 | Germany | of 1894 |